United States Patent [19]
Houde

[11] Patent Number: 6,032,043
[45] Date of Patent: Feb. 29, 2000

[54] HOME LOCATION REGISTER FEATURE DISPATCHING AND ARBITRATION IN A WIRELESS INTELLIGENT NETWORK

[75] Inventor: Michel Houde, St-Laurent, Canada

[73] Assignee: Telefonaktiebolaget L M Ericsson (publ), Stockholm, Sweden

[21] Appl. No.: 08/861,178

[22] Filed: May 21, 1997

Related U.S. Application Data

[60] Provisional application No. 60/026,711, Sep. 25, 1996.

[51] Int. Cl.[7] .................................................. H04M 11/00
[52] U.S. Cl. ........................... 455/433; 455/435; 455/445
[58] Field of Search .................................... 455/433, 434, 455/435, 445, 432, 414

[56] References Cited

U.S. PATENT DOCUMENTS

| | | | |
|---|---|---|---|
| 5,040,177 | 8/1991 | Martin et al. | 370/110.1 |
| 5,319,699 | 6/1994 | Kerihuel et al. | 455/445 |
| 5,323,452 | 6/1994 | Dickman et al. | 379/201 |
| 5,406,616 | 4/1995 | Bjorndahl | 455/433 |
| 5,428,665 | 6/1995 | Lantto | 379/58 |
| 5,504,804 | 4/1996 | Widmark et al. | 455/433 |
| 5,506,887 | 4/1996 | Emery et al. | 455/445 |
| 5,561,840 | 10/1996 | Alvesalo et al. | 455/433 |
| 5,724,658 | 3/1998 | Hasan | 455/433 |

FOREIGN PATENT DOCUMENTS

| | | |
|---|---|---|
| 0 715 473 | of 0000 | European Pat. Off. . |
| WO 95/26114 | 9/1995 | WIPO . |
| WO 96/13949 | 5/1996 | WIPO . |
| WO 97/27713 | 7/1997 | WIPO . |
| WO 9748243 | 12/1997 | WIPO . |

OTHER PUBLICATIONS

PCT International Search Report, Apr. 28, 1998, PCT/SE 97/01539.

*Primary Examiner*—Edward F. Urban
*Assistant Examiner*—Thuan T. Nguyen
*Attorney, Agent, or Firm*—Jenkens & Gilchrist

[57] ABSTRACT

Feature dispatching within a wireless intelligent network is provided by routing feature request messages to a service control point. For example, such routing is made to bypass transmission to a home location register for the mobile station. Alternatively, such routing is made by the home location register to dispatch requests relating to service features provisioned to other nodes. Still further, dispatching of requests to the home location register is made by the service control point for feature request message implicating certain service features.

Feature arbitration within a wireless intelligent network is provided by involving a service control point in call set up and delivery. In a first instance, a request message for a routing/roaming number is sent by the home location register through the service control point. In another instance, the home location register queries the service control point as to whether a service feature is implicated by the call set up and delivery. For each case, the service control point provides appropriate instructions to the home location register for handling of the call.

13 Claims, 5 Drawing Sheets

HOME LOCATION REGISTER FEATURE DISPATCHING AND ARBITRATION IN A WIRELESS INTELLIGENT NETWORK

CROSS-REFERENCE TO RELATED APPLICATION

This Application for Patent claims priority from previously filed, co-pending U.S. Provisional Application for Patent Ser. No. 60/026,711, filed Sep. 25, 1996, by Michel Houde, entitled "HLR Feature Request Dispatching and HLR Feature Arbitration", the disclosure which is hereby incorporated by reference.

BACKGROUND OF THE INVENTION

1. Technical Field of the Invention

The present invention relates to cellular communications networks and, in particular, to the network processing of subscriber service features in response to subscriber feature selection as well as to the determination of when features are implicated during call set up and delivery.

2. Description of Related Art

Existing cellular telephone networks offer their subscribers a number of special service features. Typically, these features are offered in addition to regular cellular telephone service, and thus access to and use of these features requires subscriber payment of an additional charge. Examples of these service features include voice mail, call forwarding, speed dialing, multi-leg calling, conference calls, call transfers, flexible alerting, and the like.

In the current (TR45) network reference model (NRM) for the wireless (cellular) telephone network, the home location register (HLR) is the primary network node responsible for the execution of such service features. A subscriber activates, deactivates or requests the execution of a service feature by dialing a feature code through their mobile station. A message including the dialed feature code is then sent by the mobile station over the air interface, through the base station (BS), and on to the serving mobile switching center (MSC). A feature request message is then sent by the mobile switching center to the home location register for evaluation. The home location register then returns a feature request return result message which includes instructions which specify the actions, if any, to be taken by the mobile switching center for responding to the feature code and implementing the requested service feature. A similar process relating to feature execution is implemented at the home location register in connection with the set up and delivery of an incoming call dialed to a subscriber mobile station.

Recent advances in network architecture have been made to implement a wireless intelligent network (IN) in connection with cellular telephone networks. The primary effect of intelligent network organization is to move the "intelligence" for directing operations provided by the network from its current location in each mobile switching center and perhaps other network nodes, to instead being located in one or more central nodes often referred to in the art as service control points (SCPs. It is anticipated that many if not all of the service features actuated either by subscriber dialed feature codes or in the context of a call set up and delivery will eventually be implemented by the service control point rather than the home location register. This raises network processing issues with respect to both feature dispatching (i.e., where has the service feature been implemented) following a subscriber request, and feature arbitration (i.e., the relative prioritization of the features implemented among various nodes) during call set up and delivery.

SUMMARY OF THE INVENTION

The present invention addresses the feature dispatching issue in one embodiment by having a switching node, that is currently serving a mobile station through which a feature is requested, bypass a home location register for the mobile station and instead send a feature request message for processing directly to a service control point within a wireless intelligent network that supports that feature. In another embodiment, the currently serving switching node sends the feature request message to the home location register, with the home location register handling supported service features and dispatching non-supported service features for processing to the service control point for handling. In another embodiment, the currently serving switching node sends the feature request message to the service control point, again bypassing the home location register, with the service control point handling certain service features and dispatching other service features for processing back to the home location register for handling.

The present invention addresses the feature arbitration issue in one embodiment during call set up and delivery by having the home location register send a request message for a routing/roaming number through a service control point of a wireless intelligent network. The service control point then determines whether a service feature is implicated by the call set up and delivery, and if so provides appropriate instructions back to the home location register. Otherwise, the received message is forwarded on by the service control point to a serving switching node for completion of a conventional call set up to a mobile station. In another embodiment, the home location register instead queries the service control point as to whether a service feature is implicated by the call set up and delivery. Appropriate handling of the call set up and delivery is then made by the home location register in accordance with the query response provided by the service control point.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
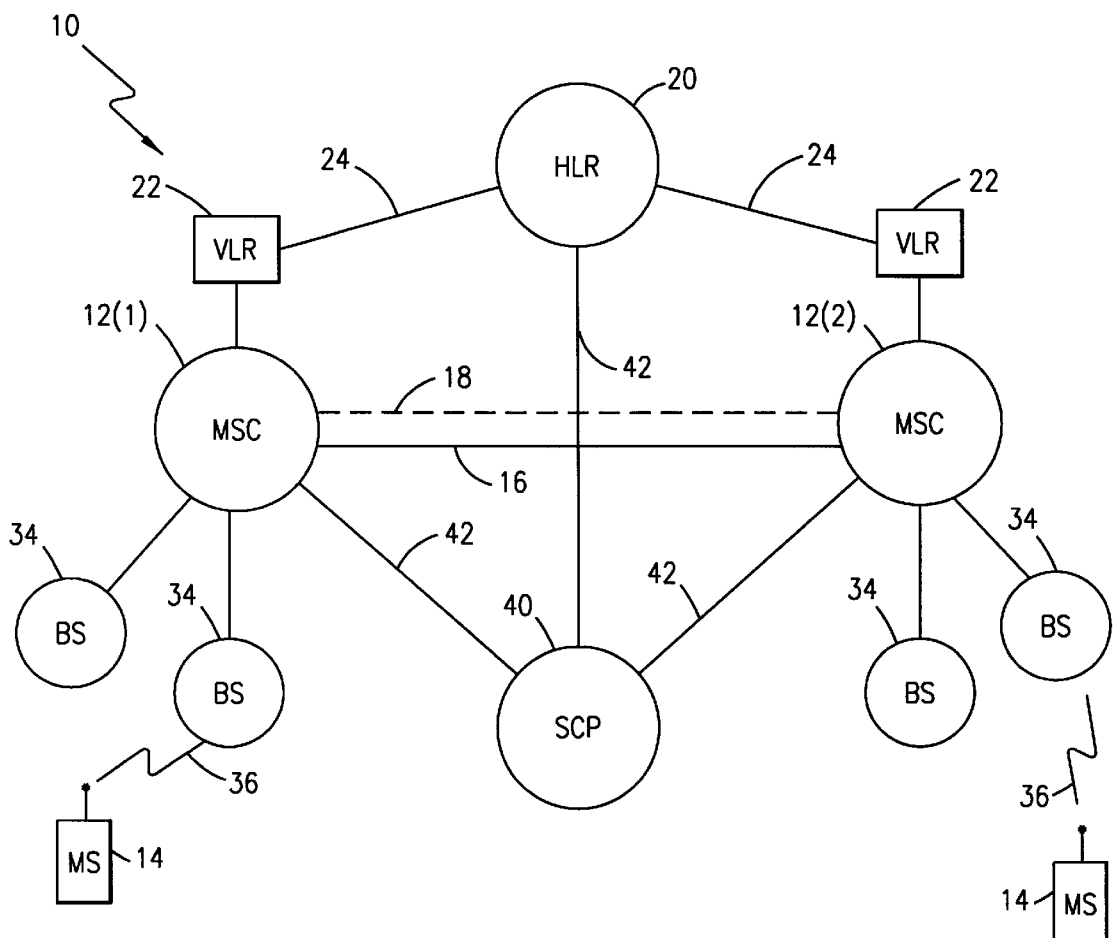
FIG. 1 is a schematic diagram of a cellular telephone network in which the present invention may be implemented.

Reference is now made to FIG. 1 wherein there is shown a schematic diagram of a cellular telephone network 10 including a plurality of interconnected mobile switching centers (MSCs) 12. Although only two mobile switching centers 12 are shown, it will be understood that the network 10 likely includes many more interconnected nodes. The first and second mobile switching centers 12(1) and 12(2) may comprise any one of a number of known telecommunications switching devices, including those commonly used and known in the art for providing either digital or analog cellular telephone service to a plurality of mobile stations (MS) 14. The mobile switching centers 12 are interconnected with each other for communication via both voice trunks 18 (illustrated with broken lines) and signaling links 16 (illustrated with solid lines) providing a known ISUP (or R1 or R2) type connection. The voice trunks 18 provide voice and data communications paths used to carry subscriber communications between the mobile switching centers 12. The signaling links 16 carry command messages between the mobile switching centers 12. These messages may be used, for example, in setting up and tearing down voice and data communications links over the voice trunks 18 and controlling the provision of calling services to the mobile stations 14.

Each mobile switching center 12 is also connected to a home location register (HLR) 20 through an associated visitor location register (VLR) 22 by means of a signaling link 24 providing a known Mobile Application Part (MAP) or IS-41 type connection. The home location register 20 stores information relating to the mobile stations 14 and their subscriptions comprising location information and service information.

The mobile switching centers 12 are further connected to a plurality of base stations (BS) 34 which operate to effectuate radio frequency communications with proximately located mobile stations 14 over the air interface 36. The mobile switching centers 12 function in a well known manner to control this radio frequency communications operation.

The cellular telephone network 10 is preferably implemented as a wireless intelligent network (IN) and thus further includes at least one service control point (SCP) 40. The mobile switching centers 12 are connected to the service control point 40 by means of signaling links 42 which utilize protocols such as Mobile Application Part (MAP), IS-41, Intelligent Network Application Part (INAP), or Transaction Capability Application Part (TCAP). The home location register 20 is further connected to the service control point 40 using the MAP, IS-41, INAP or TCAP signaling link 42. The service control point 40 provides a centralized processing platform for implementing the "intelligence" of the network 10.

Although direct communications links (signaling and/or trunk) between the nodes are illustrated in FIG. 1, it is understood by those skilled in the art that the links are not necessarily direct between the illustrated nodes, and may instead pass through many other communications nodes (not shown) of the mobile network, and perhaps even utilize other communications networks (such as the public switched telephone network—PSTN). Illustration of the links in a "virtual" manner as shown in FIG. 1 is therefore by way of simplification of the drawing and the communications relationship between the various included nodes within the network 10.

Figure 2:
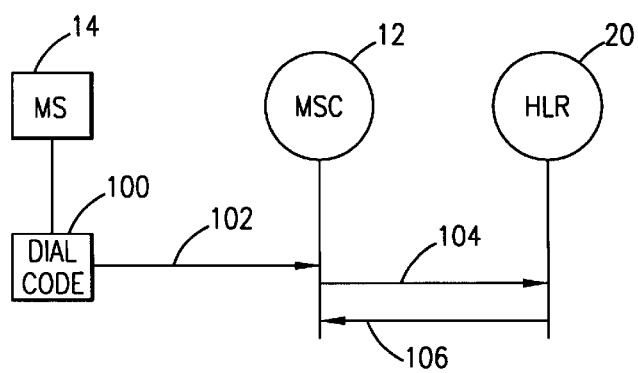
FIG. 2 is a message flow and node operation diagram illustrating operation of the cellular telephone network of FIG. 1 in a prior art manner for responding to a subscriber feature request.

Reference is now made to FIGS. 1 and 2 wherein FIG. 2 is a message flow and node operation diagram illustrating operation of the cellular network of FIG. 1 in a prior art manner for responding to a subscriber feature request. The feature request is dialed (action 100) by a subscriber into their mobile station 14. A feature origination message 102 is then sent by the mobile station 14 (over the air interface and through the base station) to the mobile switching center 12. In response thereto, the mobile switching center 12 sends a feature request message 104, including the dialed feature code, to the home location register 20. The home location register 20 then processes the message 104 to determine whether the subscriber is authorized to use the feature, and if so, what actions need to be taken in response to the request and what instructions, if any, need to be presented to the mobile switching center to effectuate the feature. A feature request return result message 106, including the necessary instructions, is then sent by the home location register 20 back to the mobile switching center 12.

Figure 3:
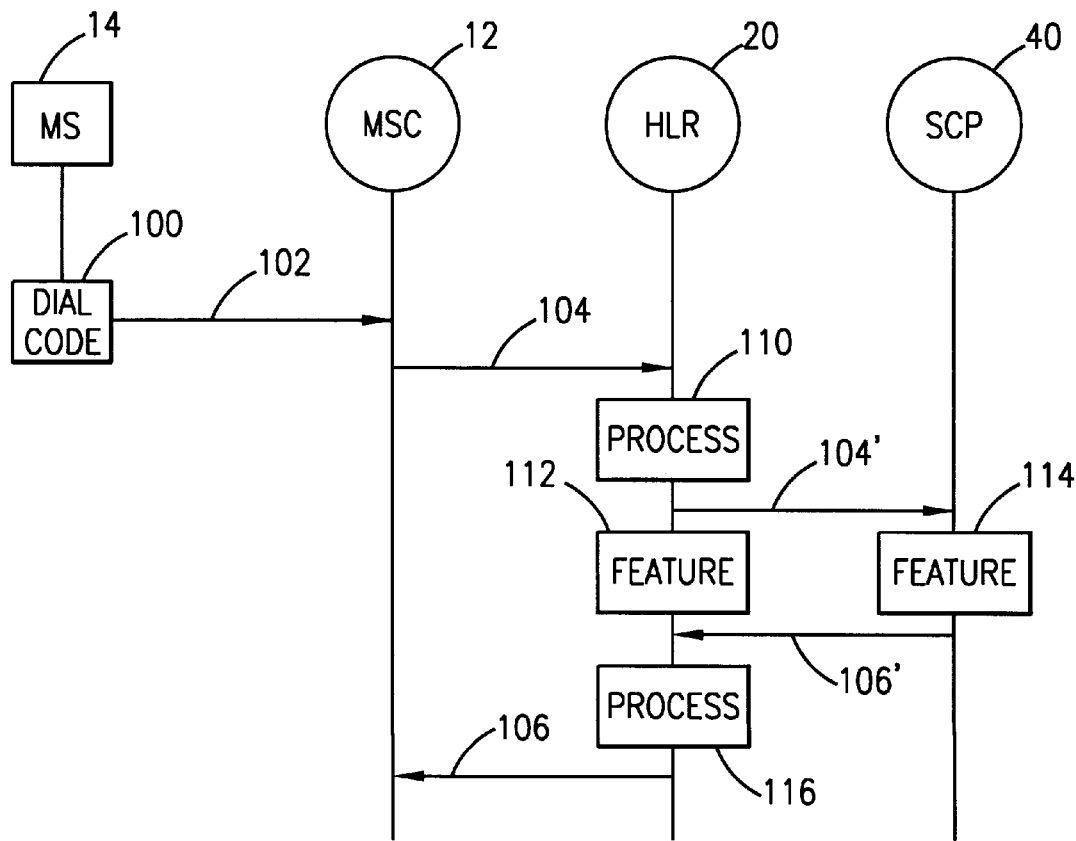
FIG. 3 is a message flow and node operation diagram illustrating operation of the cellular telephone network of FIG. 1 in accordance with a first embodiment of the present invention for responding to a subscriber feature request.

Reference is now additionally made to FIG. 3 wherein there is shown a message flow and node operation diagram illustrating operation of the cellular network of FIG. 1 in accordance with a first embodiment of the present invention for responding to a subscriber feature request. The feature request is dialed (action 100) by a subscriber into their mobile station 14. A feature origination message 102 is then sent by the mobile station 14 (over the air interface and through the base station and perhaps base station controller—not shown) to the mobile switching center 12. In response thereto, the mobile switching center 12 sends a feature request message 104, including the dialed feature code, to the home location register 20. The home location register 20 then processes (action 110) the message 104 to determine whether the subscriber is authorized to use the feature. If so, the home location center 20 further determines in action 110 whether the service is implemented in the home location register or the service control point 40. This decision may be made based on an evaluation of a number of factors including home location register provisioning capabilities and loading, as well as a prioritization of subscripted to features.

If the home location register 20 is to handle the request, it further determines in step 112 what actions need to be taken in response to the request and what instructions, if any, need to be presented to the mobile switching center 12 to effectuate the feature. A feature request return result message 106, including the necessary instructions, is then sent by the home location register 20 back to the mobile switching center 12 where the feature is initiated.

If the home location register is not to handle the request, the service is dispatched to the service control point 40 for handling. A feature request message 104', including the dialed feature code, is sent to the appropriate service control point 40. The service control point 40 then processes the message 104' to determine what actions need to be taken in response to the request and what instructions, if any, need to be presented to the mobile switching center 12 to effectuate the feature (action 114). A feature request return result message 106'/106, including the necessary instructions, is then sent by the service control point 40 back, through the home location register 20, to the mobile switching center 12 where the feature is initiated. Additional processing (action 116) may be performed by the home location register in connection with the initiated feature, or with respect to another service that may also need to be initiated in connection with the mobile station.

The determination as to whether the home location register should handle a feature code or the service control point should handle the feature code is made in accordance with the concept of provisioning. In the preceding example, the home location register receives the feature request. It knows, through provisioning, which feature code (or more generally, which trigger) is handled by which node of the network. The home location register may itself handle some features, while the provisioning identifies some features which are handled by other nodes such as the service control point. When the home location register identifies a feature request associated with a feature code/trigger handled by another node, the request is dispatched to that node.

In this operational configuration, the home location register remains in control over feature execution. It may execute the feature itself, or pass execution on (i.e., dispatch) to a service control point. As a further alternative, the home location register may dispatch the feature request on to another home location register instead of to a service control point. The process implemented by the home location register in action 110 may further be implemented to identify through the provisioning which one of two or more service control points 40 presents the proper node for responding to the subscriber selected feature. Again, the provisioning identifies the node or nodes which are responsible for certain features/triggers, and dispatching is performed in accordance with such responsibilities. The multi-service control point dispatching here is analogous to the multi-dispatching operation performed with respect to the mobile switching center 12 feature handling (through dotted line messages 104', 105', 104", 106' and 107') in FIG. 5. Such dynamic control by the home location register over execution of the feature is necessary to respond to current network conditions such as: node availability (due to loading constraints); node failures; feature upgrades (due to new versions of a feature implemented by a new or upgraded service control point); and market needs (due to a subscriber split of services between many service control points).

Figure 4:
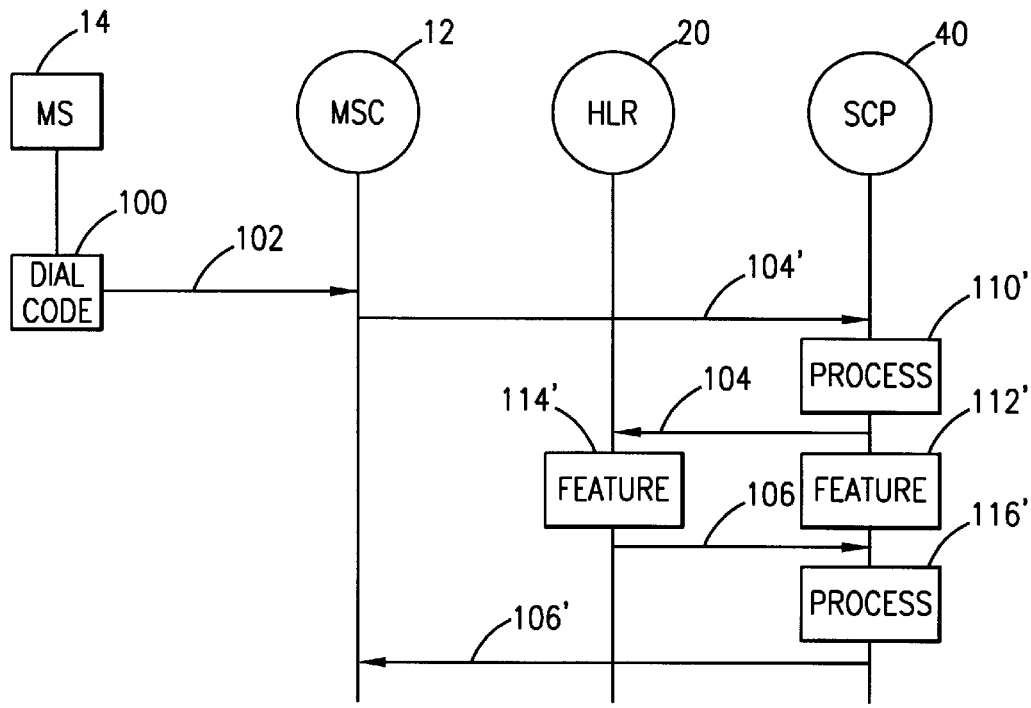
FIG. 4 is a message flow and node operation diagram illustrating operation of the cellular telephone network of FIG. 1 in accordance with a second embodiment of the present invention for responding to a subscriber feature request.

Reference is now additionally made to FIG. 4 wherein there is shown a message flow and node operation diagram illustrating operation of the cellular network of FIG. 1 in accordance with a second embodiment of the present invention for responding to a subscriber feature request. The feature request is dialed (action 100) by a subscriber into their mobile station 14. A feature origination message 102 is then sent by the mobile station 14 (over the air interface and through the base station) to the mobile switching center 12. In response thereto, the mobile switching center 12 sends a feature request message 104', including the dialed feature code, to the service control point 40. The service control point 40 then processes (action 110') the message 104' to determine whether the subscriber is authorized to use the feature. If so, the service control point 40 further determines in action 110' whether the service feature is implemented in the service control point 40 or the home location register 20. This decision may be made based on an evaluation of a number of factors including service control point provisioning capabilities and loading, as well as feature prioritization.

If the service control point 40 is to handle the request, it further determines in step 112' what actions need to be taken in response to the request and what instructions, if any, need to be presented to the mobile switching center 12 to effectuate the feature. A feature request return result message 106', including the necessary instructions, is then sent by the service control point 40 back to the mobile switching center 12 where the feature is implemented.

If the service control point 40 instead passes on handling the request, the service is dispatched to the home location register 20 for handling. A feature request message 104, including the dialed feature code, is sent to the appropriate home location register 20. The home location register 20 then processes (action 114') the message 104 to determine what actions need to be taken in response to the request and what instructions, if any, need to be presented to the mobile switching center 12 to effectuate the feature. A feature request return result message 106/106', including the necessary instructions, is then sent by the home location register 20 back, through the service control point 40, to the mobile switching center 12 where the feature is implemented. Additional processing (action 116') may be performed by the service control point in connection with the initiated feature, or with respect to another service that may also need to be initiated in connection with the mobile station.

In this operational configuration, the service control point remains in control over feature execution. It may execute the feature itself, or pass execution on (i.e., dispatch) to a home location register. As a further alternative, the service control point may dispatch the feature request on to another service control point instead of to a home location register. The process implemented by the service control point in action 110' may further be implemented to identify which one of two or more service control points 40 presents the proper node for responding to the subscriber selected feature. The multi-service control point dispatching here is analogous to the multi-dispatching operation performed with respect to the mobile switching center 12 feature handling (through dotted line messages 104', 105', 104", 106' and 107') in FIG. 5. Such dynamic control by the service control point over execution of the feature is necessary to respond to current network conditions such as: node availability (due to loading constraints); node failures; feature upgrades (due to new versions of a feature implemented by a new or upgraded service control point); and market needs (due to a subscriber split of services between many service control points).

Figure 5:
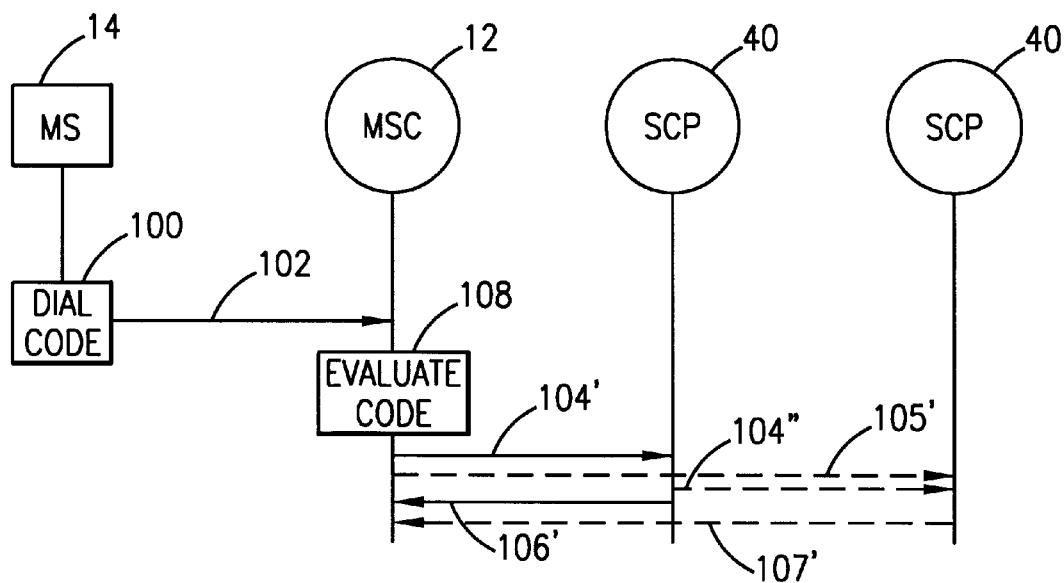
FIG. 5 is a message flow and node operation diagram illustrating operation of the cellular telephone network of FIG. 1 in accordance with a third embodiment of the present invention for responding to a subscriber feature request.

Reference is now additionally made to FIG. 5 wherein there is shown a message flow and node operation diagram illustrating operation of the cellular network of FIG. 1 in accordance with a third embodiment of the present invention for responding to a subscriber feature request. The feature request is dialed (action 100) by a subscriber into their mobile station 14. A feature origination message 102 is then sent by the mobile station 14 (over the air interface and through the base station) to the mobile switching center 12. In response thereto, the mobile switching center 12 evaluates the mobile station identification number and the dialed code, and then sends a feature request message 104'/105', including the dialed feature code, to the appropriate service control point 40. The service control point 40 then processes the message 104'/105' to determine whether the subscriber is authorized to use the feature, and if so, what actions need to be taken in response to the request and what instructions, if any, need to be presented to the mobile switching center 12 to effectuate the feature. A feature request return result message 106'/107', including the necessary instructions, is then sent by the service control point 40 back to the mobile switching center 12 where the feature is implemented.

The process of FIG. 5 may be implemented in conjunction with the process of FIG. 2 by having the mobile switching center evaluate (action 108) mobile station identification number and the dialed feature code to determine whether the feature request message 104 should be sent to the home location register 20, or alternatively the feature request message 104'/105' should be sent to the service control point 40. One service control point 40 may receive the message 104' and then dispatch it to another service control point for responding to the subscriber selected feature (as illustrated by the dotted line message 104"). Dispatching occurs here in accordance with the specified provisioning of the mobile switching center, along with a consideration of loading and prioritization factors. Alternatively, static/dynamic control over the dispatching may be performed. In static dispatching, the mobile switching center is instructed where to send the feature request with respect to all mobile stations currently being served. Alternatively, in dynamic dispatching, the mobile switching center is instructed where to send the feature request with respect to the certain mobile station making the request. A mixture of static and dynamic dispatching may also be performed.

Figure 6:
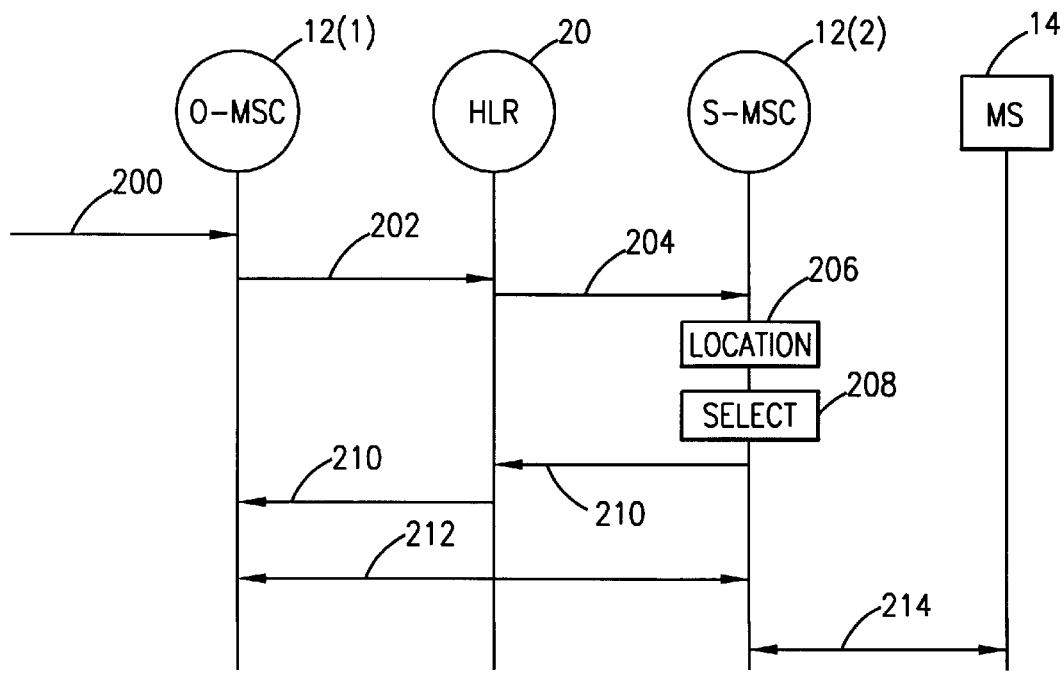
FIG. 6 is a message flow and node operation diagram illustrating operation of the cellular telephone network of FIG. 1 in a prior art manner for effectuating a call set up and delivery.

Reference is now made to FIGS. 1 and 6 wherein FIG. 6 shows a message flow and node operation diagram illustrating operation of the cellular network of FIG. 1 in a prior art manner for effectuating a call set up and delivery. A call 200 dialed to the directory number (B-number) of a mobile station 14 originates from another cellular subscriber or the public switched telephone network (PSTN), and is received at the first (originating or gateway) mobile switching center 12(1). The originating mobile switching center 12(1) then interrogates the home location register 20 with a location request (send routing) message 202. The location request (send routing) message 202 is processed by the home location register 20 to determine the location (i.e., second or serving mobile switching center 12(2)) within the cellular network 10 of the called mobile station 14. Responsive to this interrogation, the home location register 20 messages the serving mobile switching center 12(2) for the called mobile station 14 with a routing request (provide roaming) message 204 to prepare for the call. The serving mobile switching center 12(2) then determines in action 206, to some selected degree of granularity, the location (for example, location area) of the called mobile station 14. This location may be identified, for example, based on information resulting from a most recent registration (not shown) of the called mobile station 14 as stored in the visitor location register 22 (not shown in FIG. 6) associated with the serving mobile switching center 12(2). Alternatively, the serving mobile switching center 12(2) may page (not shown) the called mobile station 14, and process the page response (not shown) to make a more precise location determination. In accordance with this determined location, the serving mobile switching center 12(2) selects in action 208 an appropriate routing number (for example, a temporary location directory number (TLDN) or a roaming number) for that location. In this instance, the routing number is selected from a plurality of such numbers associated with the serving mobile switching center 12(2). The selected routing number is then returned 210 to the originating mobile switching center 12(1) via the home location register 20. The incoming call is then delivered (through connected) 212 to the serving mobile switching center 12(2) using the routing number for attempted completion to the called mobile station 14(1).

Completion of the call involves further routing 214 the incoming call to the currently serving base station 34 (perhaps through the base station controller 28), and then to the called mobile station 14(1) over the air interface 36.

Figure 7:
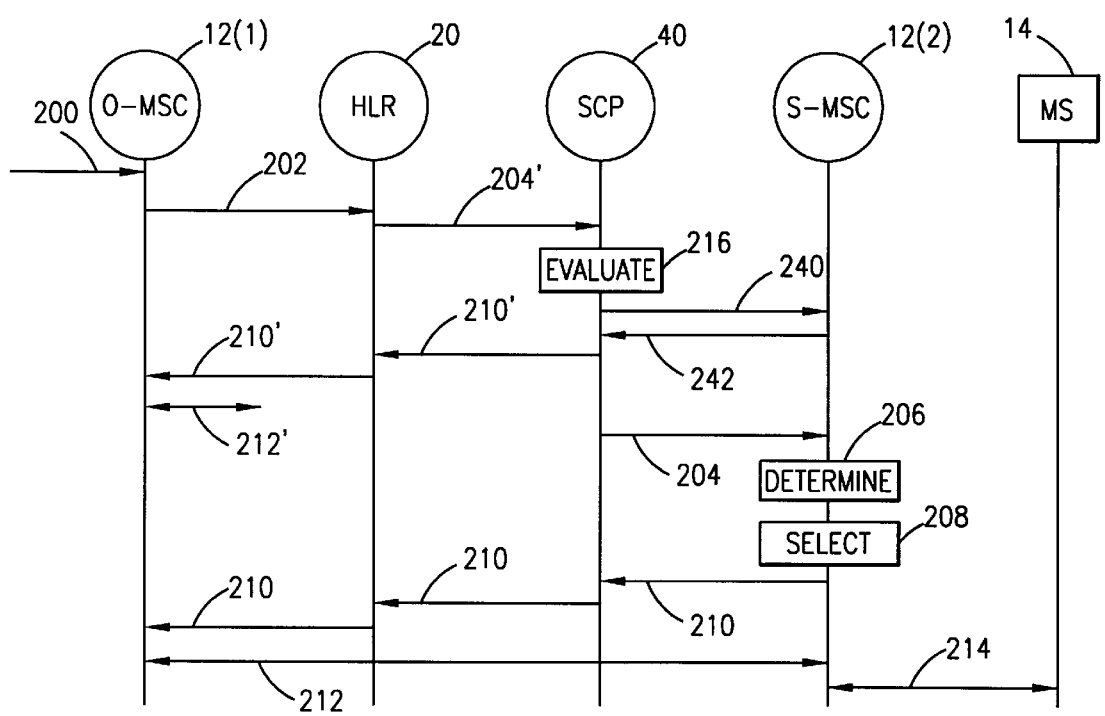
FIG. 7 is a message flow and node operation diagram illustrating operation of the cellular telephone network of FIG. 1 in accordance with a first embodiment of the present invention for effectuating a call set up and delivery.

Reference is now additionally made to FIG. 7 wherein there is shown a message flow and node operation diagram illustrating operation of the cellular network of FIG. 1 in accordance with a first embodiment of the present invention for effectuating a call set up and delivery. A call 200 dialed to the directory number (B-number) of a mobile station 14 originates from another cellular subscriber or the public switched telephone network (PSTN) and is received at the first (originating or gateway) mobile switching center 12(1). The originating mobile switching center 12(1) then interrogates the home location register 20 with a location request (send routing) message 202. The home location register 20 assesses the active home location register based features subscribed to by the mobile station 14 subscriber, finds that none apply, and then recognizes that lower priority features which are subscripted to and apply are handled by the service control point 40. The home location register 20 then sends a routing request (provide roaming) message 204' to the service control point 40. Responsive thereto, the service control point 40 evaluates (action 216) the requested call set up to the mobile station 14 in the context of implicating certain subscripted to service features. Thus, it will be understood that the message 204' includes the home location register specified parameters necessary for making the evaluation 216. If these parameters are not provided by the home location register, the service control point 40 may obtain them, for example, by making an appropriate query 240 to, and receiving an appropriate response 242 from, either the serving mobile switching center 12(2) (as shown) or the home location register 20 (not shown).

The evaluation 216 made by the service control point 40 may indicate that a call set up and delivery to the mobile station 14 should not be completed at this time. For example, such would be the case if the mobile station 14 subscriber had activated a "do not disturb" service feature by dialing an appropriate code (processed in the manner described above in FIGS. 3, 4 or 5). Other subscriber controllable service features known to those skilled in the art may further be actuated to affect in some degree the completion of a call set up to the mobile station 14. Such features include call forwarding unconditional, voice mail redirection, or call handling based on parameters (such as time of day, day or week, and the like). Responsive to an indication that call set up and delivery should not be completed, the service control point 40 sends a routing request return result message 210', including instructions for further handling of the incoming call 200, back to the serving mobile switching center 12(1) through the home location register. The call is then alternatively completed 212' in accordance with the received instructions. This alternative completion may comprise, for example, the forwarding of the call to a voice mail box instead of to the called mobile station.

If, on the other hand, the evaluation 216 indicates that call set up and delivery should be completed, a determination is made of the location (i.e., second or serving mobile switching center 12(2)) within the cellular network 10 of the called mobile station 14. The serving mobile switching center 12(2) for the called mobile station 14 is then signaled by the service control point 40 with a routing request (provide roaming) message 204 to prepare for the call. The serving mobile switching center 12(2) then determines in action 206, to some selected degree of granularity, the location (for example, location area) of the called mobile station 14. In accordance with this determined location, the serving mobile switching center 12(2) selects in action 208 an appropriate routing number (for example, a temporary location directory number (TLDN) or a roaming number) for that location. In this instance, the routing number is selected from a plurality of such numbers associated with the serving mobile switching center 12(2). The selected routing number is then returned 210 to the originating mobile switching center 12(1) via the service control point 40 and home location register 20. The incoming call is then delivered (through connected) 212 to the serving mobile switching center 12(2) using the routing number for attempted completion to the called mobile station 14(1). Completion of the call involves further routing 214 the incoming call to the currently serving base station 34, and then to the called mobile station 14(1) over the air interface 36.

Figure 8:
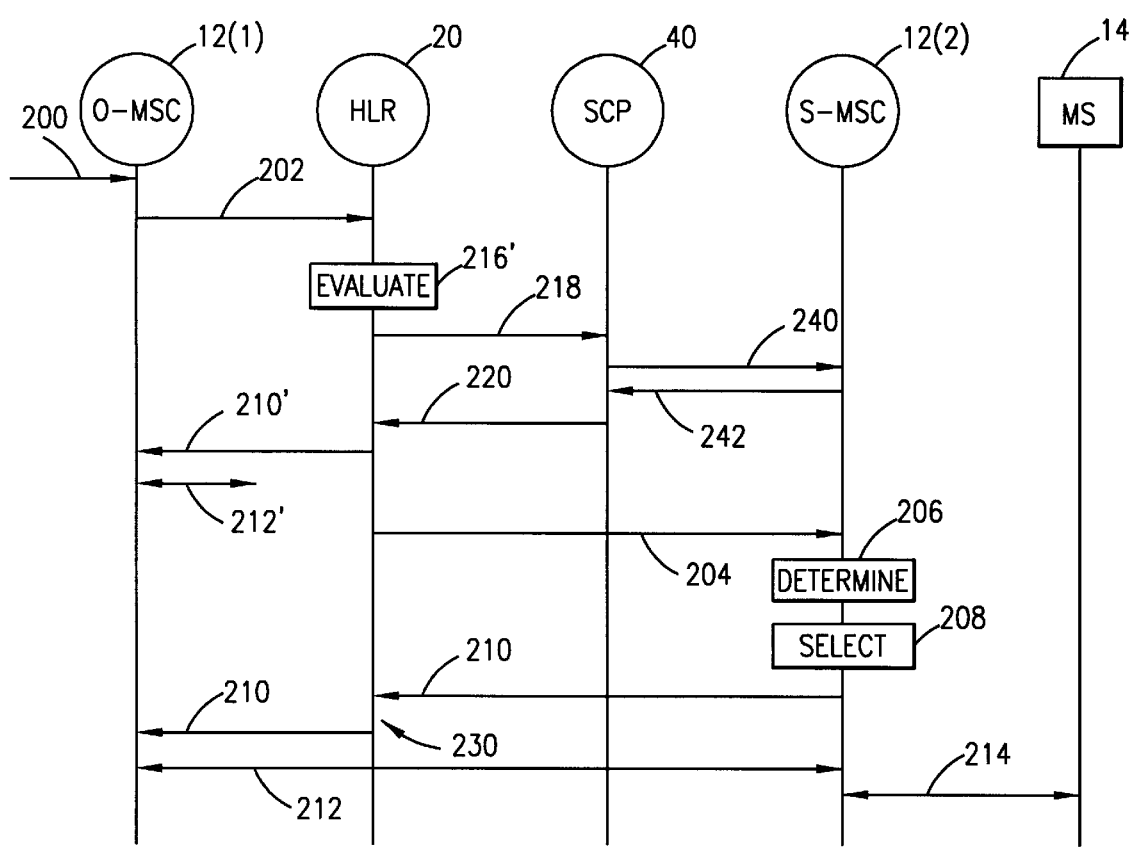
FIG. 8 is a message flow and node operation diagram illustrating operation of the cellular telephone network of FIG. 1 in accordance with a second embodiment of the present invention for effectuating a call set up and delivery.

Reference is now additionally made to FIG. 8 wherein there is shown a message flow and node operation diagram illustrating operation of the cellular network of FIG. 1 in accordance with a second embodiment of the present invention for effectuating a call delivery. A call 200 dialed to the directory number (B-number) of a mobile station 14 originates from another cellular subscriber or the public switched telephone network (PSTN) and is received at the first (originating or gateway) mobile switching center 12(1). The originating mobile switching center 12(1) then interrogates the home location register 20 with a location request (send routing) message 202. The home location register 20 recognizes that it may not necessarily support all of the service features subscripted to by the called mobile station 14 subscriber with respect to call delivery. An evaluation 216' is then made to determine which features are to be executed in connection with the current incoming call. If a determined feature is handled by the home location register 20, it is implemented when and if needed in connection with the handling of the incoming call 200. If, on the other hand, a determined feature is not handled by the home location register 20, a service query 218 is made of a service control point 40 which does support that feature. Again, this is determined by the specific provisioning established within the network, as well as in consideration of other factors such as loading and prioritization. In the event that multiple service features may be implicated by the call set up and delivery, multiple sequential queries 218 may be made of the service control node (only one such query shown). It will be understood that the message 218 includes the home location register specified parameters necessary for determining how to handle the incoming call. If these parameters are not provided by the home location register, the service control point 40 may obtain them, for example, by making an appropriate query 240 to, and receiving an appropriate response 242 from, the serving mobile switching center 12(2) (as shown) or the home location register 20 (not shown). Responsive thereto, the service control point 40 sends a service query response 220/210', including instructions for further handling of the incoming call 200, back to the serving mobile switching center 12(1). The feature is then implemented when and if needed in connection with the handling of the incoming call 200 in accordance with the received instructions.

The evaluation 216' and received instructions, if any, may indicate that a call set up and delivery to the mobile station 14 should not be completed at this time. For example, such would be the case if the mobile station 14 subscriber had activated a "do not disturb" service feature by dialing an appropriate code (processed in the manner described above in FIGS. 3, 4 or 5). Responsive to an indication that call set up should not be completed, the home location register 20 sends a location request return result message 210', including instructions for further handling of the incoming call 200, back to the serving mobile switching center 12(1). The call is then alternatively completed 212' in accordance with the received instructions. This alternative completion may comprise, for example, the forwarding of the call to a voice mail box.

If, on the other hand, the evaluation 216' and instructions, if any, indicates that call set up and delivery should be completed, a determination may be made of the location (i.e., serving mobile switching center 12(2)) within the cellular network 10 of the called mobile station 14. The serving mobile switching center 12(2) for the called mobile station 14 is then signaled by the home location register 20 with a routing request (provide roaming) message 204 to prepare for the call. The serving mobile switching center 12(2) then determines in action 206, to some selected degree of granularity, the location (for example, location area) of the called mobile station 14. In accordance with this determined location, the serving mobile switching center 12(2) selects in action 208 an appropriate routing number (for example, a temporary location directory number (TLDN) or a roaming number) for that location. In this instance, the routing number is selected from a plurality of such numbers associated with the serving mobile switching center 12(2). The selected routing number is then returned 210 to the originating mobile switching center 12(1) via the service control point 40 and home location register 20. The incoming call is then delivered (through connected) 212 to the serving mobile switching center 12(2) using the routing number for attempted completion to the called mobile station 14(1). Completion of the call involves further routing 214 the incoming call to called mobile station 14(1).

It will, of course, be understood that the assistance of the service control point 40 in connection with the handling of the incoming call for feature arbitration, like that in feature dispatching, is made as a function of feature priority. By this it is meant that the features of a given subscriber are prioritized and implemented through the home location register and/or the service control point in accordance with that priority. Thus, certain features are implemented in the home location register, while others are implemented in the service control point. Furthermore, the assistance of the home location register or service control point may be sought at any time during the call set up and delivery process. Thus, the actions of evaluating 216' and querying 218 implemented by the home location register 20 in response to the location request (send routing) message 202, followed by the query 240 and responses 242 and 220, may alternatively be implemented at other times during call set up and delivery such as, for example, as generally indicated at 230, following serving mobile switching center 12(2) return 210 of the selected routing number for the incoming call 200. It will further be understood that the action of querying 218 may be taken by the home location register 20 on multiple occasions in connection with a single incoming call 200 and call set up procedure if the called mobile station 14 subscriber is subscripted to plural service features, and more than one of those features are executable in the context of completing a call set up and delivery. In each such case of a query 218, the service query response 220 returned to the home location register 20 includes the necessary instructions for further handling of the incoming call 200. Again, such actions are taken in accordance with the designated priority of the feature.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for feature dispatching in a wireless intelligent network including a serving mobile switching center, a home location register and a service control point, comprising the steps of:

receiving at the serving mobile switching center a feature origination message from a mobile station, the feature origination message indicative of a mobile station subscriber selection of a given service feature;

sending a feature request message from the serving mobile switching center to the service control point in response to receipt of the feature origination message;

processing of the feature request message by the service control point to:

determine whether the mobile station subscriber subscribes to the selected given service feature;

execute the given service feature selected by the mobile station subscriber, if the mobile subscriber subscribes to said given service feature; and determine whether the home location register supports the given service feature selected by the mobile station subscriber;

sending the received feature request message on to the home location register; and processing of the feature request message by the home location register to executed the given service feature selected by the mobile station subscriber.

2. The method as in claim 1 further including the step of:

processing the received feature origination message by the serving mobile switching center to determine which one of a plurality of service control points supports the given service feature selected by the mobile station subscriber; and wherein the step of sending the feature request message comprises the step of sending the feature request message to the one of the plurality of service control points which supports the given service feature.

3. A method for feature dispatching in a wireless intelligent network including a serving mobile switching center, a home location register and a service control point, comprising the steps of:

receiving at the serving mobile switching center a feature origination message from a mobile station, the feature origination message indicative of a mobile station subscriber selection of a given service feature;

sending a feature request message from the serving mobile switching center to the home location register in response to receipt of the feature origination message;

determining whether the home location register supports the given service feature selected by the mobile station subscriber; and processing of the feature request message by the home location register to execute the given service feature selected by the mobile station subscriber if supported by the home location register;

otherwise wherein the home location register does not support the given service feature:

sending the received feature request message from the location register on to the service control point; and processing of the feature request message by the service control point to execute the given service feature selected by the mobile station subscriber.

4. The method as in claim 3 wherein the step of processing of the feature request message by the home location register includes the step of determining whether the mobile station subscriber subscribes to the selected given service feature.

5. The method as in claim 4 further including the step of:

processing the received feature origination message by the home location register to determine which one of a plurality of service control points supports the given service feature selected by the mobile station subscriber; and wherein the step of sending the feature request message comprises the step of sending the feature request message to the one of the plurality of service control points which supports the given service feature.

6. A method for feature arbitration in a wireless intelligent network including an origination mobile switching center, a serving mobile switching center, a home location register and a service control point, comprising the steps of:

receiving at the origination mobile switching center an incoming call dialed to a mobile station;

sending a location request message from the origination mobile switching center to the home location register;

processing of the location request message by the home location register to determine whether any service features subscribed to in association with the dialed mobile station, are implicated by delivery of the incoming call and to execute said implicated service features if supported by the home location register;

wherein the home location register does not support at least one of said implicated service features:

sending a routing request message from the home location register to the service control point in response to receipt of the location request message sent by the origination mobile switching center;

processing the routing request message by the service control point to determine whether any service features subscribed to in association with the dialed mobile station, are implicated by delivery of the incoming call; and completing call set up with respect to the incoming call in accordance with any implicated service features.

7. The method of claim 6 wherein the step of completing call set up comprises the steps of:

providing by the service control point of instructions for handling of the incoming call in accordance with any implicated service features; and handling the incoming call according to the provided instructions.

8. The method of claim 6 wherein the step of completing call set up comprises the steps of:

forwarding the routing request message to the serving mobile switching center;

returning a routing number from the serving mobile switching center to the origination mobile switching center through the service control point; and through connecting the incoming call to the serving mobile switching center using the returned routing number.

9. The method as in claim 6 wherein the step of processing the routing request message by the service control point comprises the step of querying the serving mobile switching center for information needed to determine whether any service features subscribed to in association with the dialed mobile station are implicated by delivery of the incoming call.

10. A method for feature arbitration in a wireless intelligent network including an origination mobile switching center, a serving mobile switching center, a home location register and a service control point, comprising the steps of:

receiving at the origination mobile switching center an incoming call dialed to a mobile station;

sending a location request message from the origination mobile switching center to the home location register;

processing of the location request message by the home location register to determine whether any service features subscribed to in association with the dialed mobile station, are implicated by delivery of the incoming call and to execute said implicated service features if supported by the home location register;

wherein the home location register does not support at least one of said implicated service features:

query the service control point by the home location register, in response to receipt of the location request message sent by the origination mobile switching center;

processing the query by the service control point to determine whether any service features, subscribed to in association with the dialed mobile station, are implicated by delivery of the incoming call; and completing call set up with respect to the incoming call in accordance with any implicated service features.

11. The method of claim 10 wherein the step of completing call set up comprises the steps of:

providing by the service control point to the home location register of instructions for handling of the incoming call in accordance with any implicated service features; and handling the incoming call according to the provided instructions.

12. The method of claim 10 wherein the step of completing call set up comprises the steps of:

providing by the service control point to the home location register of instructions for delivery of the incoming call;

sending a routing request message from the home location register to the serving mobile switching center;

returning a routing number from the serving mobile switching center to the origination mobile switching center through the home location register; and through connecting the incoming call to the serving mobile switching center using the returned routing number.

13. The method as in claim 10 wherein the step of processing the query by the service control point comprises the step of querying the serving mobile switching center for information needed to determine whether any service features, subscripted to in association with the dialed mobile station, are implicated by delivery of the incoming call.

* * * * *